United States Patent
Fang et al.

(10) Patent No.: US 8,000,219 B2
(45) Date of Patent: Aug. 16, 2011

(54) METHOD AND APPARATUS FOR SPECTRUM MANAGEMENT

(75) Inventors: Liming Fang, Shenzhen (CN); Lihe Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 219 days.

(21) Appl. No.: 12/433,287

(22) Filed: Apr. 30, 2009

(65) Prior Publication Data

US 2009/0268601 A1    Oct. 29, 2009

Related U.S. Application Data

(63) Continuation of application No. PCT/CN2007/071002, filed on Nov. 1, 2007.

(30) Foreign Application Priority Data

Nov. 1, 2006   (CN) .......................... 2006 1 0137806

(51) Int. Cl.
  *H04J 1/12*   (2006.01)

(52) U.S. Cl. ...................................... 370/201

(58) Field of Classification Search ............... 370/252, 370/201, 251
See application file for complete search history.

(56) References Cited

U.S. PATENT DOCUMENTS

| 6,292,559 | B1 * | 9/2001 | Gaikwad et al. | 379/417 |
| 6,636,603 | B1 * | 10/2003 | Milbrandt | 379/399.01 |
| 2005/0129227 | A1 | 6/2005 | Ahmdt et al. | |
| 2008/0212614 | A1 | 9/2008 | Zhou | |

FOREIGN PATENT DOCUMENTS

| CN | 1647452 | 7/2005 |
| CN | 1832364 | 9/2006 |
| WO | 9933215 A1 | 7/1999 |
| WO | WO-2005057315 | 6/2005 |

OTHER PUBLICATIONS

1st Office Action in corresponding Chinese Application No. 200610137806.0 (Aug. 25, 2010).

* cited by examiner

*Primary Examiner* — Derrick Ferris
*Assistant Examiner* — Mohammad Anwar
(74) *Attorney, Agent, or Firm* — Leydig, Voit & Mayer, Ltd.

(57) ABSTRACT

A method and apparatus for spectrum management in an xDSL system are disclosed. The method mainly include: determining a transmit PSD mask according to a crosstalk status of a line; performing IWF operation using the transmit PSD mask; and dynamically managing line spectrum according to the result of the IWF operation. Therefore, various embodiments of the present invention allow the DSLAM performance to approximate the OSM performance without the need for a center controller and with a rather simple algorithm in a severe crosstalk scenario. Moreover, the embodiments of the present invention may help to simply the design of DSLAM optimization system and achieve a proper balance between the DSLAM performance and the complexity.

7 Claims, 9 Drawing Sheets

REPEAT

FOR EACH TONE $k$: $(s_k^1, s_k^2, ..., s_k^N) = \arg \max J_k$, $k = 1, 2, ..., K$ FOR EACH USER $n$: $w_n = [w_n + \varepsilon_w (R_n^{target} - \sum_{k=1}^{K} b_k^n)]^+$, $n = 2, 3, ..., N$ FOR EACH USER $n$: $\lambda_n = [\lambda_n + \varepsilon_\lambda (\sum_{k=1}^{K} s_k^n - P_n)]^+$, $n = 1, 2, ..., N$

UNTIL CONVERGENCE

WHERE, $s_k^n$ : DENOTES THE TRANSMIT POWER OF SUBSCRIBER LINE n ON TUNE k;

$P_n$ : DENOTES A TRANSMIT POWER CONSTRAINT ON SUBSCRIBER LINE n;

$b_k^n$ : DENOTES THE ACHIEVABLE NUMBER OF BITS LOADED ON SUBSCRIBER LINE N ON TONE k;

$R^{target}$ : DENOTES A TARGET LINE RATE.

FIG.6

START

↓ S 202

CONSTRUCT A MATHEMATICAL MODEL $J_k \cong J_k^n = w_n b_k^n - \lambda_n s_k^n$

↓ S 204

CALCULATE $s_k^1, s_k^2, ..., s_k^N$ WHICH RENDER $J_k$ AT ITS MAXIMUM. THE SOLVING PROCESS IS ILLUSTRATED IN FIGURE 8, WHICH IS OMITTED HEREIN FOR BREVITY

↓ S 206

ADJUST THE TRANSMIT POWER OF EACH MODEM ON THE SAME CABLE ACCORDING TO THE CALCULATED $s_k^1, s_k^2, ..., s_k^N$

↓

END   FIG.7

REPEAT
    FOR EACH USER $n = 1, 2, ..., N$
        REPEAT
            FOR EACH TONE $k$, KEEP $s_k^m$ CONSTANT,
            $\forall m \neq n$, LET $w_m = 0, \forall m \neq n$ $$s_k^n = \arg\max(w_n b_k^n - \lambda_n s_k^n).$$

$$\text{IF}(\textstyle\sum_{k=1}^{K} s_k^n > P_n) \text{ THEN } \lambda_n = [\lambda_n + \varepsilon(\textstyle\sum_{k=1}^{K} s_k^n - P_n)]^+,$$

$$\text{ELSE } \lambda_n = [\lambda_n + \varepsilon(\textstyle\sum_{k=1}^{K} b_k^n - R_n^{target})]^+,$$

UNTIL CONVERGENCE
    END
UNTIL CONVERGENCE
WHERE,
  $s_k^n$ : DENOTES THE TRANSMIT POWER OF SUBSCRIBER LINE n ON TUNE k;
  $P_n$ : DENOTES A TRANSMIT POWER CONSTRAINT ON SUBSCRIBER LINE n;
  $b_k^n$ : DENOTES THE ACHIEVABLE NUMBER OF BITS LOADED ON SUBSCRIBER LINE n ON TONE k;
  $R^{target}$ : DENOTES A TARGET LINE RATE.

METHOD AND APPARATUS FOR SPECTRUM MANAGEMENT

CROSS-REFERENCE TO RELATED APPLICATIONS

This application is a continuation of International Application No. PCT/CN2007/071002, filed on Nov. 1, 2007, which claims the benefit of Chinese Patent Application No. 200610137806.0, filed on Nov. 1, 2006, both of which are hereby incorporated by reference in their entireties.

BACKGROUND

1. Field of the Invention

The present invention relates to communication field, and more specifically, to method and apparatus for spectrum management in xDSL system.

2. Description of the Related Art xDSL, which refers to various Digital Subscriber Line, is a high-speed data transmission technique over telephone twisted pair (Unshielded Twisted Pair, UTP). For years of development, xDSL has evolved from a first generation of Asymmetrical Digital Subscriber Line (ADSL) to the current second generation ADSL2, ADSL2+, as well as the more advanced Very-high-bit-rate Digital Subscriber Line (VDSL) and VDSL2. ADSL and VDSL are a type of xDSL system which adopts a Discrete Multi-Tone Modulation (DMT) to divide the frequency into several non-overlapping subchannels. Each subchannel is designated for upstream transmission or downstream transmission. Each subchannel corresponds to a carrier with different frequency and conducts a QAM modulation on each different carrier. Such frequency division significantly facilitates DSL designs.

In various xDSL techniques, except for baseband DSL, such as, Internet Digital Subscriber Line (IDSL) and Symmetrical Highbit Digital Subscriber Line (SHDSL), passband xDSL adopts frequency division multiplex (FDM) technique to allow xDSL and Plain Old Telephone Service (POTS) to coexist on a same pair of twisted wires, in which the xDSL takes up the high frequency bands while the POTS takes up frequency baseband below 4 KHz. The POTS signal and the xDSL signal are separated by a splitter. Passband xDSL adopts DMT to perform modulation and demodulation.

Figure 1:
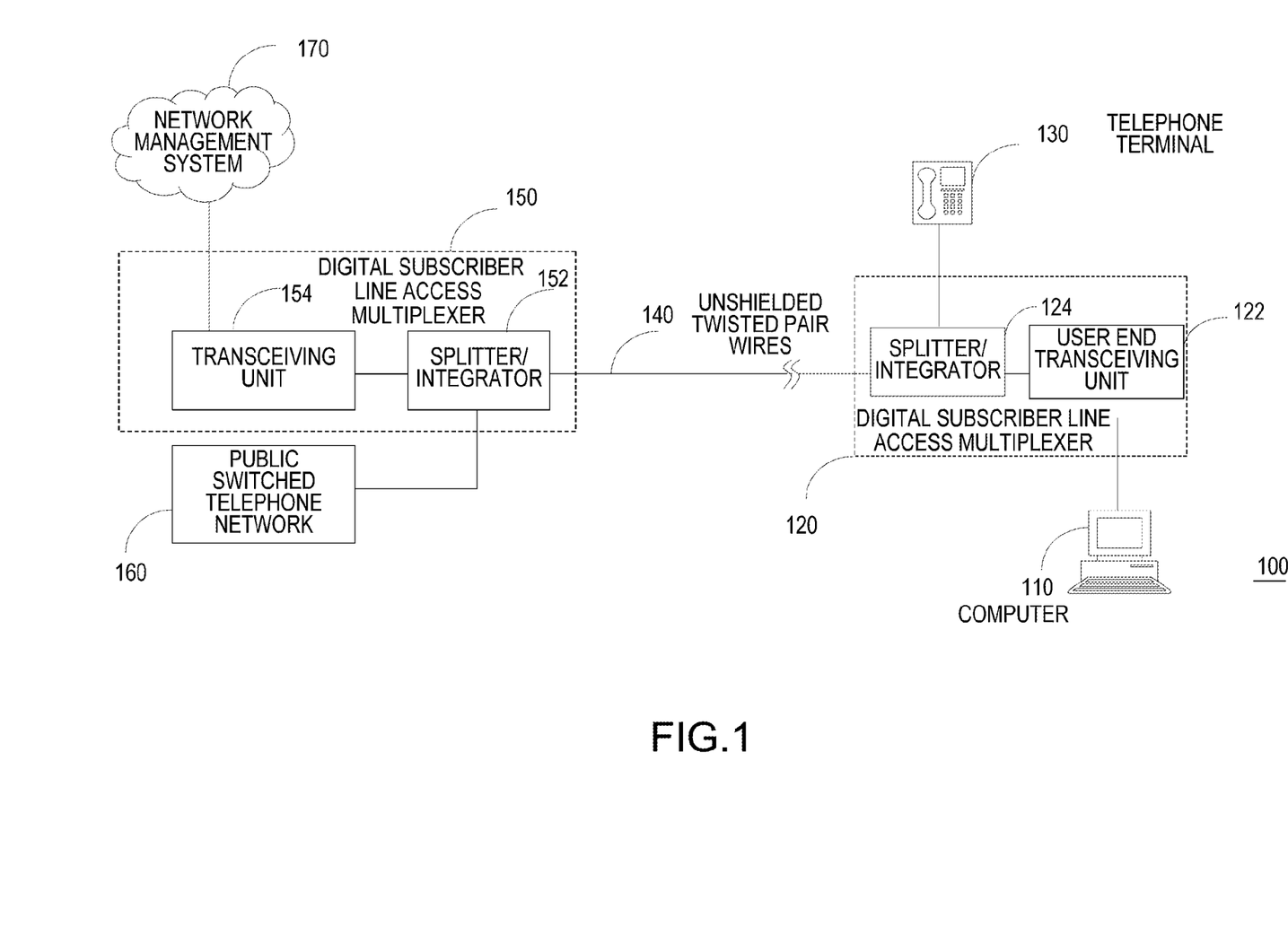
FIG. 1 illustrates a diagram of a prior art reference module of xDSL system.

The system providing multiple xDSL accesses is referred to as a Digital Subscriber Line Access Multiplexer (DSLAM). A reference module for DSLAM is illustrated in FIG. 1. FIG. 1 illustrates a prior art reference module of xDSL system 100.

As illustrated in FIG. 1, a DSLAM 120 includes a user end transceiving unit 122 and a splitter/integrator 124. In upstream direction, the user end transceiving unit 122 receives a DSL signal from a computer 110, amplifies the received the signal, and transmits the processed DSL signal to the splitter/integrator 124. The splitter/integrator 124 integrates the DSL signal from the user end transceiving unit 122 and a POTS signal from a telephone terminal 130. The integrated signals are transmitted via a multiple UTP 140 and are received by a splitter/integrator 152 in a remote DSLAM 150. The splitter/integrator 152 separates the received signals. The POTS signal in the received signals is transmitted to the Public Switched Telephone Network (PSTN) 160. The DSL signal in the received signals is transmitted to a transceiving unit 154 of the DSLAM 150. Then, the transceiving unit 154 amplifies the received signal and transmits the amplified signal to a Network Management System (NMS) 170. In downstream direction, signals are transferred in a reverse order.

With the improvement of the xDSL technology on the spectrum usage, crosstalk, especially on a high frequency band, is becoming a prominent issue.

Figure 2:
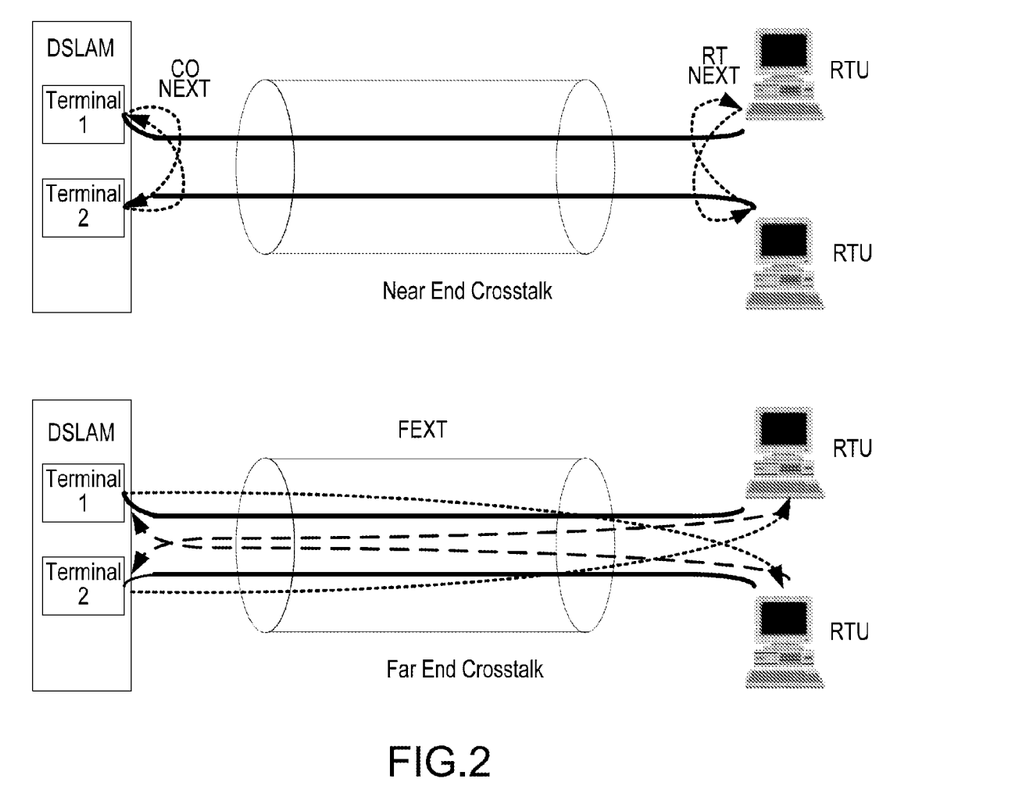
FIG. 2 is a diagram illustrating Far End Crosstalk and Near End Crosstalk according to prior art.

FIG. 2 is a diagram illustrating Far End Crosstalk and Near End Crosstalk in accordance with related arts.

A subscriber cable typically includes multiple pairs of twisted wires (25 pairs or more). A plurality of different services may run on each twisted pair wire. Crosstalk may occur when different types of xDSLs run at the same time. The performance of some lines may degrade dramatically due to this reason. For longer wires, some wires may not be able to provide any form of DSL service. Crosstalk is a dominant factor affecting the user rate in the current DSL modem (e.g., ADSL, VDSL) system. Crosstalk can be divided into Far End Crosstalk (FEXT) and Near End Crosstalk (NEXT), as illustrated in FIG. 2. Usually, the influence exerted by NEXT is greater than by FEXT. However, in ADSL/VDSL, due to the use of technique which divides frequency by upstream and downstream and due to the use of frequency division multiplex technique, the influence of FEXT is far greater than NEXT, especially in a Central Office (CO)/Remote Terminal (RT) scenario where CO and RT are used in mixture.

The crosstalk is analyzed below in detail.

In a communication model with a DMT mode, N users, K tones, the signal at each tone of the receiving end can be independently modeled as:

$$y_k = H_k x_k + \sigma_k \quad (1)$$

where $H_k$: denotes an N*N transfer matrix on tone k.

$y_k$: denotes the signal received by a certain user on tone k.

$x_k$: denotes the signal transmitted by a certain user on tone k.

$\sigma_k$: denotes a noise signal of a certain user on tone k.

In normal cases, a receiving end of each xDSL modem treats the interferences imposed by other modems as noise. The data rate of user n achieved on tone k can be calculated according to Shannon formula for channel capacity.

$$b_k^n = \log_2\left(1 + \frac{|h_k^{n,n}|^2 s_k^n}{\sum_{m \neq n} |h_k^{n,m}|^2 s_k^m + \sigma_k^n}\right) \quad (2)$$

where $s_k^n$: denotes the transmit power of subscriber line n on tune k.

$h_k^{n,m}$: denotes a channel crosstalk function from user m to user n on tune k.

$h_k^{n,n}$: denotes a transmit function of user n on tone k.

$\sigma_k^n$: denotes the noise signal of user n on tune k; and $b_k^n$: denotes the achievable number of bits loaded on subscriber line n on tone k.

The outcome of formula (2) is the number of bits loaded on each tone, i.e., the user data rate achievable on tone k. For a severe crosstalk, the $s_k^m$ may be larger, which leads to a small outcome derived from the whole formula, decreasing thereby the line rate. As can be seen from formula (2), crosstalk has a severe impact on the transmit capacity. In other words, the line rate is decreased.

As shown in FIG. 2, since the upstream and downstream channels of xDSL adopt FDM mode, the NEXT may not exert too much impact on the system performance. However, FEXT may impair severely the transmission performance of the lines. When multi-users in a bundle of cables require to activate xDSL service, FEXT may lead to a low line rate and unstable performance, or even the inability to serve the services, etc, which ultimately leads to a low DSLAM line activation rate.

DSM technology cancels or attenuates noise by adjusting the transmit power of each frequency band so as to accelerate the data rate. A traditional power adjusting method is a static spectrum management method including a Plat Power Back-Off, a Reference PSD Method and a Reference Noise Method, etc. Dynamic Spectrum Management (DSM) is a recently proposed method for managing power allocation more effectively. Such method overcomes the drawbacks of the static spectrum management method and is able to cancel or attenuate the influence of crosstalk among each user by dynamically adjusting the power so that the line rate can be accelerated significantly. Especially, in the case where CO and RT are used in mixture, the crosstalk from the short lines has a more severe impact on the long lines.

The purpose of the DSM is to adjust the spectrum control parameter in real time or periodically without violating the spectrum compatibility so that the system can operate in an optimal state.

Figure 3:
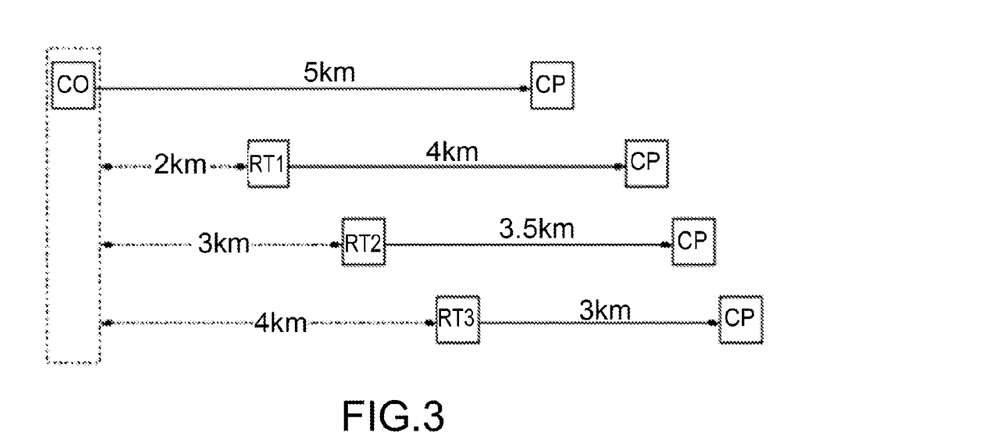
FIG. 3 illustrates a diagram of transmitting separately at user ends and receiving jointly at DSLAM end.

Specifically, the purpose of DSM is to cancel the crosstalk by automatically adjusting the transmit power on each modem in the same cable. Particularly, in the case where CO and RT are used in mixture, the short lines have a more severe crosstalk impact on the long lines. As illustrated in FIG. 3, the impact from line 2 on line 1 is greater than the impact from line 1 on line 2. In FIG. 3, the lines are numbered as 1, 2, 3, 4 from top to down. An object of the DSM is to allow each modem to achieve a balance between the maximum achievable rate and the minimum of crosstalk impact on the other modems by adjusting the transmit power of each modem.

DSM methods can be categorized into two types. The first type is a Central Office based method, for instance, Optimum Spectrum Balancing (OSB) algorithm, Iterative Spectrum Balancing (ISB) algorithm, etc. The second type is a distributed method, such as, Iterative Water Filling (IWF), Autonomous Spectrum Balancing (ASB), etc. These two types of algorithms are illustrated in detail.

OSB method is a DSM optimization method. Suppose that there are N users, and each user has K tones, where N−1 users have a target rate. The basic problem of DSM can be expressed as to enhance the rate of the first user as fast as possible while guarantee the rates of N−1 users. Meanwhile, each signal power should meet the requirement of maximum power spectrum density (PSD), and the total power of each user should meet a corresponding constraint $$\sum_{k=1}^{K} s_k^n \le P_n,$$

where $P_n$ is a maximum allowable transmit power for user n. Due to the nonconvexity of this problem, all possible value for $s_k^n$ need to be enumerated for obtaining all the solutions to the problem directly. Consequently, the algorithm results in an exponential computation problem in both user N and tone K, i.e. $O(e^{KN})$. OSB adopts a coupling method to formulate the above problem as $$J = \max_{s_1, \ldots, s_N} R_1 + \sum_{n=2}^{N} w_n R_n - \sum_{n=1}^{N} \sum_{k=1}^{K} \lambda_n s_k^n \quad (3)$$

$$\text{s.t.} \ 0 \le s_k^n \le s_{max}, k = 1, \ldots, K; n = 1, \ldots, N$$

where $s_k^n$: denotes the transmit power of subscriber line n on tone k.

$$R_n = \sum_{k=1}^{K} b_k^n;$$

denotes a total rate of subscriber line n.

$w_n, \lambda_n$ are Lagrangian operators respectively.

The target function in formula (3) can further be transformed to $$J = \sum_{k=1}^{K} b_k^1 + \sum_{n=2}^{N} \sum_{k=1}^{K} w_n b_k^n - \sum_{n=1}^{N} \sum_{k=1}^{K} \lambda_n s_k^n \quad (6)$$

$$= \sum_{k=1}^{K} \left( \sum_{n=1}^{N} (w_n b_k^n - \lambda_n s_k^n) \right)$$

$$= \sum_{k=1}^{K} J_k$$

$$J_k = \sum_{n=1}^{N} (w_n b_k^n - \lambda_n s_k^n) \quad (7)$$

where
$s_k^n$ denotes the transmit power of subscriber line n on tune k.
$b_k^n$: denotes the achievable number of bits loaded on subscriber line n on tone k.
$w_n, \lambda_n$ are Lagrangian operators respectively.

Here $w_1=1$, considering $J_k$ is only related with the power allocation $s_k^1, s_k^2, \ldots, s_k^N$ on tune k, and is irrelevant with the power allocation on other tunes, we only need to enumerate the power allocation for each user on tone k to calculate the maximum $J_k$. An optimal solution to J can be obtained by solving max $J_k$ for each independent tone respectively. OSB reduces the original computational complexity to $O(Ke^N)$ while guarantees to find the optimal solution.

The detailed implementation of DSM will be illustrated in connection with FIG. 4.

Figure 4:
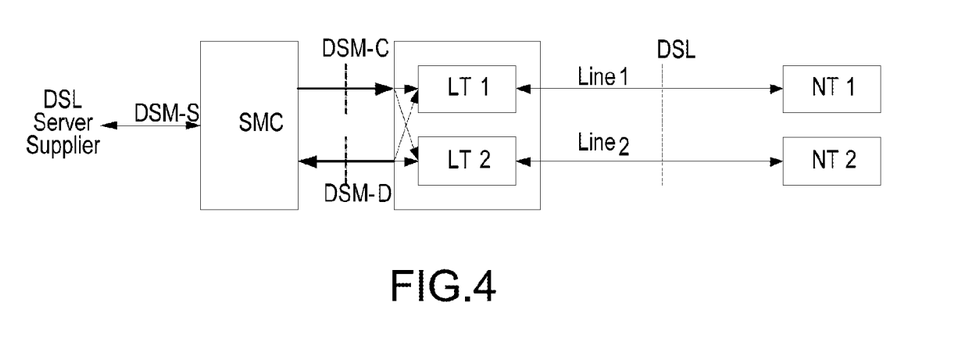
FIG. 4 illustrates a prior art DSM reference model.

FIG. 4 illustrates a DSM reference model according to related arts.

The mainstream architecture of the first layer of DSM includes a Spectrum Management Center (SMC) and three control interfaces, namely, DSM-S, DSM-C, DSM-D. SMC reads DSL parameters such as operating state from DSL-LT via interface DSM-D. The SMC exchanges information with associated SMC via the interface DSM-S. With sufficient information, the SMC performs a series of optimization algorithms and then delivers control parameters via DSM-C to the DSL-LT. As such the line may operate at its optimal state.

The detailed implementation of OSB is illustrated in connection with FIGS. 5 and 6.

Figure 5:
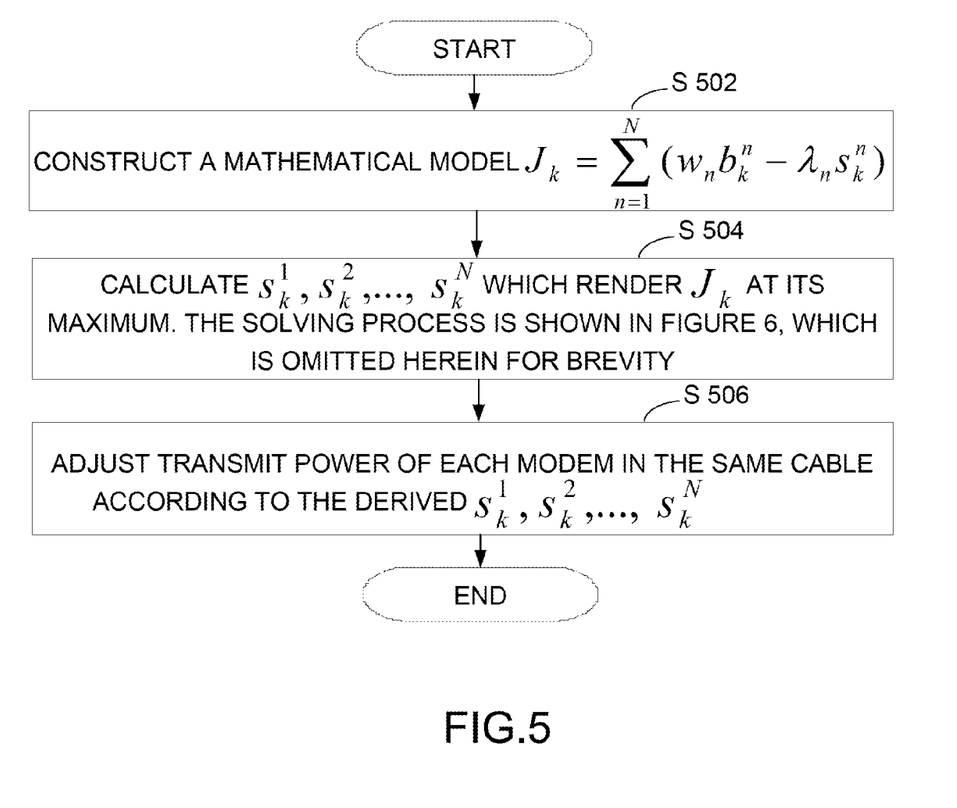
FIG. 5 illustrates a flowchart of implementing OSB method according to prior art.

FIG. 5 illustrates a flowchart for implementing the OSB method according to related arts. FIG. 6 illustrates a process for solving a mathematical model for OSB method according to related arts.

As illustrated in FIG. 5, the process for implementing the OSB method includes the following steps.

Step S502: A mathematical model $$J_k = \sum_{n=1}^{N} (w_n b_k^n - \lambda_n s_k^n)$$

is constructed.

Step S504: $s_k^1, s_k^2, \ldots s_k^N$ that render $J_k$ at its maximum is calculated. The solving process is shown in FIG. 6. Enumeration is performed on all $s_k^n$ on space $[0, s_{max}]^N$ with a certain granularity until convergence. That is, calculations are performed upon each tone k to obtain $s_k^1, s_k^2, \ldots, s_k^N$ which render $J_k$ at its maximum until all the constraints are met and there are no more changes to the power allocation. For each user n, $w_n$ and $\lambda_n$ are adjusted dynamically according to how the constraints are met.

Step S506: Transmit power of each modem in the same cable is adjusted according to the derived $s_k^1, s_k^2, \ldots, s_k^N$.

Figure 6:
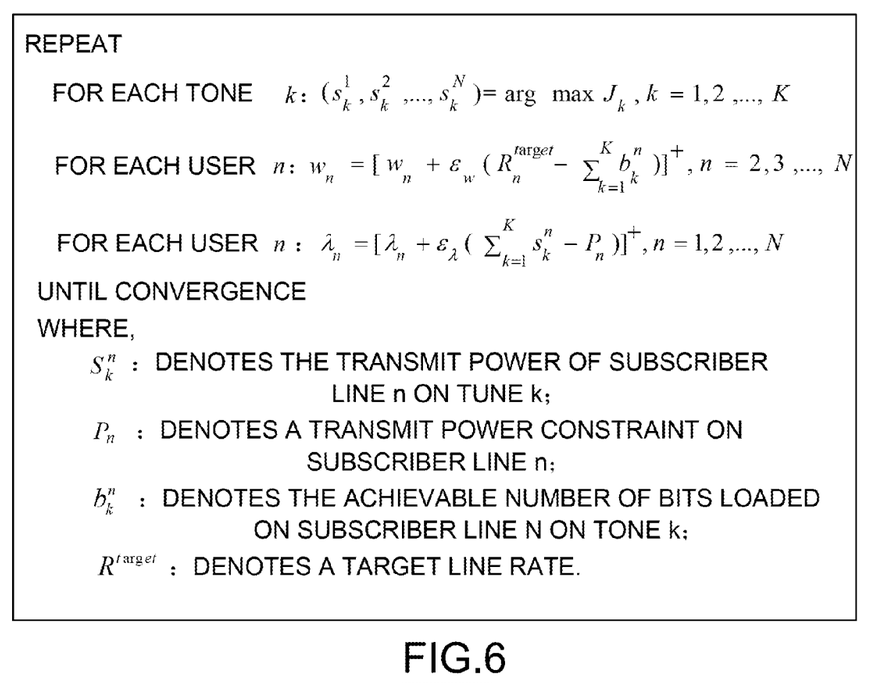
FIG. 6 illustrates a diagram of calculating a mathematical model according to prior art OSB method.

In the solving process as shown in FIG. 6, when calculating $s_k^1, s_k^2, \ldots, s_k^N$ for the maximum $J_k$, since $J_k$ is a nonconvex function, there is no simple analytic solution. Therefore, in order to obtain the optimal $s_k^1, s_k^2, \ldots, s_k^N$, enumeration needs to be performed on all $s_k^n$ on the $[0, s_{max}]^N$ space. When a round of enumeration is over, $w_n$ and $\lambda_n$ will be adjusted depends on how the constraints are met. If the constraints are met already, the value of $w_n$ or $\lambda_n$ for a corresponding subscriber line may be reduced so as to minimize the impact exerted by this portion on the whole target function. If the constraints are not met yet, the value of $w_n$ or $\lambda_n$ for a corresponding subscriber line needs to be increased so as to increase the weight of this portion in the whole target function. The algorithm is repeated until all the constraints are met and there is no more change to the power allocation. At this point the algorithm can be regarded as convergent. The proof of the convergence of the algorithm is described in R. Cendrillon, W. Yu, M. Moonen, J. Verlinden, and T. Bostoen, "Optimal multi-user spectrum management for digital subscriber lines" accepted by IEEE Transactions on Communications, 2005.

The OSB is an optimization algorithm. When the number of users N is not too large, the calculation result can be obtained in an acceptable time period. However, when the number of users increase, the computational time is increased exponentially, which may not be tolerated in a while. In other words, the advantages of the OSB lie in optimality and calculability in case N is small. The disadvantages of OBS lie in exponential complexity, non-autonomy, and requirement for data interaction with a center manager.

An alternative DSM method is IWF method.

IWF method refers to Iterative Water Filling method which is a type of greedy algorithm. It only takes into consideration the impact of the change of $s_k^n$ on the line rate of user n, rather than the interference on other lines from optimization perspective. Its target function $J_k$ can be expressed as $J_k \cong J_k^n = w_n b_k^n - \lambda_n s_k^n$.

Figure 7:
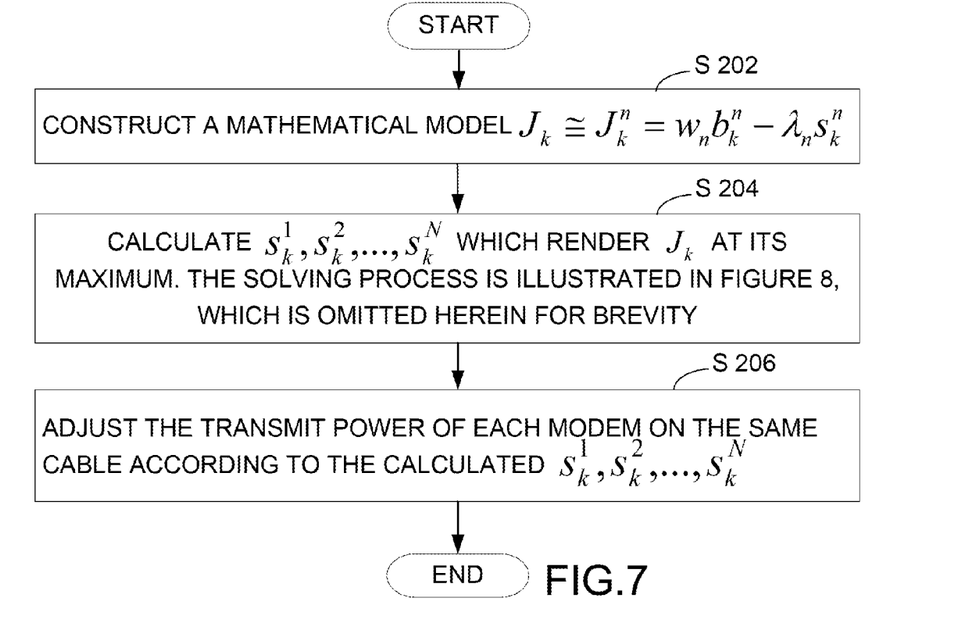
FIG. 7 illustrates a flowchart of implementing the IWF method according to prior art.
Figure 8:
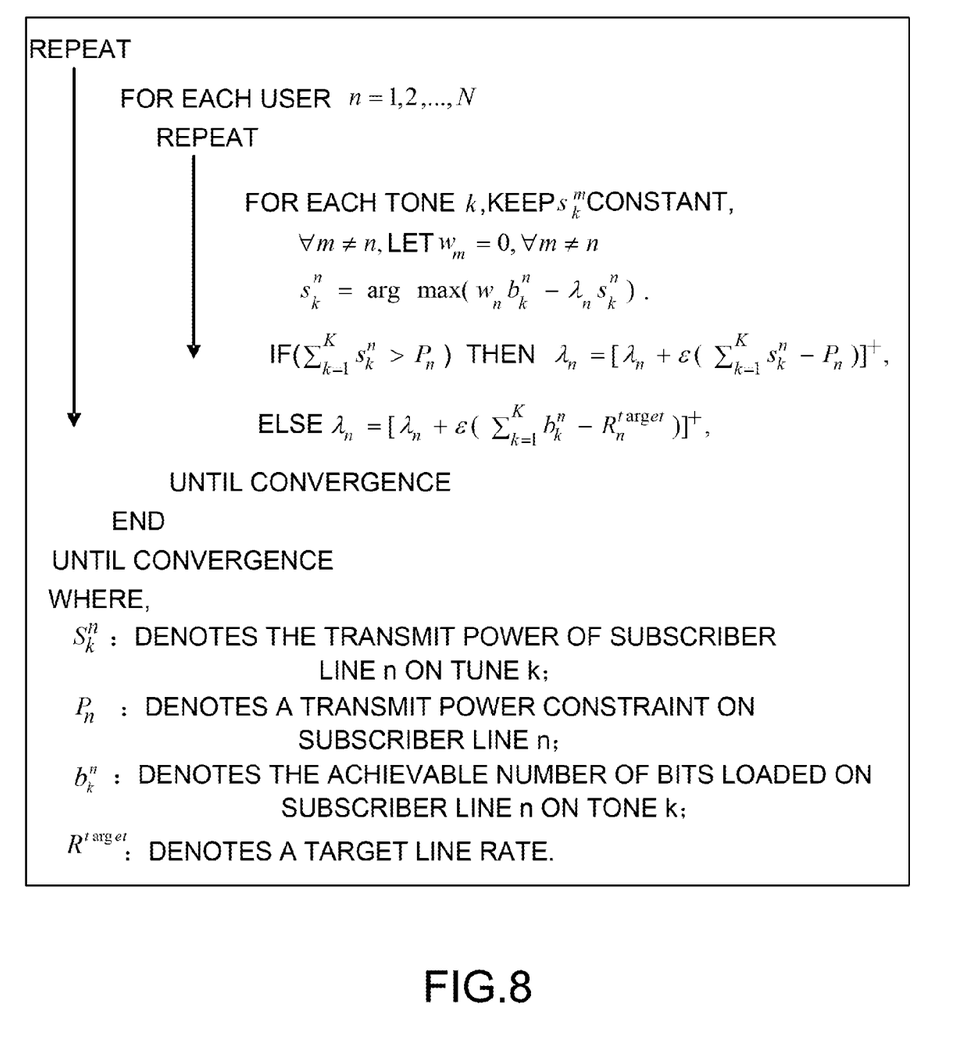
FIG. 8 illustrates a diagram of solving a mathematical model for IWF method according to prior art.

FIG. 7 illustrates a flowchart for implementing the IWF method according to related arts. FIG. 8 illustrates a process for solving a mathematical model for IWF method according to related arts.

As illustrated in FIG. 7, the IWF method may be detailed as follows.

Step S202: A mathematical model $J_k \cong J_k^n = w_n b_k^n - \lambda_n s_k^n$ is constructed.

Step S204: $s_k^1, s_k^2, \ldots s_k^N$ that render $J_k$ at its maximum is calculated. The solving process is illustrated in FIG. 8, which is omitted herein for brevity.

Step S206: The transmit power of each modem on the same cable is adjusted according to the calculated $s_k^1, s_k^2, \ldots, s_k^N$.

As mentioned above, the solution searched by IWF algorithm is a local optimal solution, rather than a global optimal solution. The calculation result is not as good as that of OSB.

The computational complexity regarding the IWF method is relatively low. For a larger N and K, the computation can also be carried out. Moreover, it is completely autonomous. That is, each user only needs to optimize its own rate and satisfies it own power constraint, instead of exchanging data information with different users. In other words, it does not need a center manager, which is feasible in practical system.

In short, the advantages of the IWF lie in low computational complexity, autonomy, no need for a center manager, feasibility. The disadvantages of IWF lie in that it is greedy and can not ensure an optimal solution or an approximate optimal solution.

Table 3 lists a comparison between OSB algorithm and IWF algorithm regarding advantages and disadvantage.

TABLE 3 comparison between OSB algorithm and IWF algorithm

| Algorithm | Advantages | Disadvantages |
|---|---|---|
| OSB (optimization algorithm) | optimality, and calculability in case N is small | exponential complexity in N, non-autonomy, and requirement for data interaction with a center manager |
| IWF (greedy algorithm) | low computational complexity, autonomy, no need for a center manager, feasibility | greedy and can not ensure an optimal solution or can only approximate optimal solution |

The aforementioned OSB method and the IWF method are representative. More simplified methods related to OSB and extended methods related to IWF, etc, can be included.

As mentioned above, the first type of algorithm stands on a global optimization perspective. According to this algorithm a quite optimal result regardless of the environment may always be found. However, the algorithm is quite complex and the computational complexity increases exponentially as the number of users increases. Moreover, equipment such as a center controller is needed, which increases the cost. The second type does not stand on a global optimization perspective. With this algorithm, local optimal result may be obtained. The algorithm is quite simple and does not require additional equipment.

Figure 9:
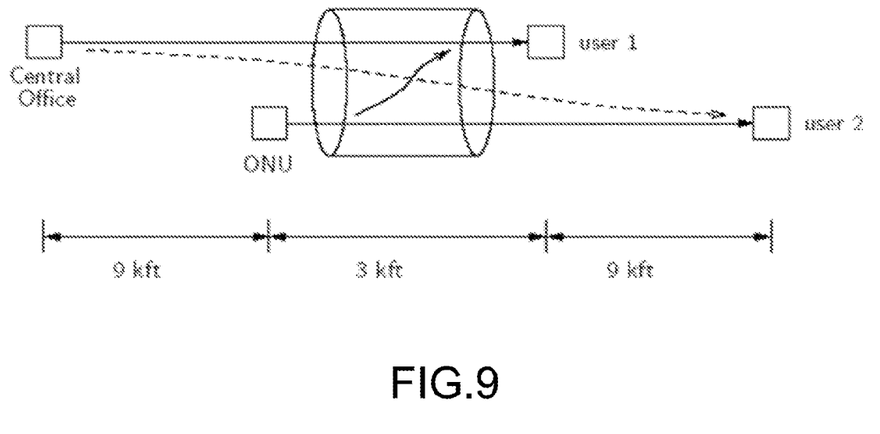
FIG. 9 illustrates a worse crosstalk scenario according to prior art.

FIG. 9 illustrates a scenario having a rather severe crosstalk. In this scenario, one subscriber line has a greater crosstalk impact on the other subscriber line. As illustrated in FIG. 9, for a signal transmitted from ONU to be coupled to user 1 lines, the signal needs to go though a relatively short distance of attenuation, which causes a considerable crosstalk. For a signal transmitted from the Central Office to be coupled to user 2 line, the signal needs to go through a relatively long distance of attenuation. Accordingly, in this case, user2 has a greater crosstalk impact on user 1. Such loop scenario where the impact of crosstalk imposed by one subscriber line on the other subscriber line differs dramatically is considered as a severe scenario.

Figure 10:
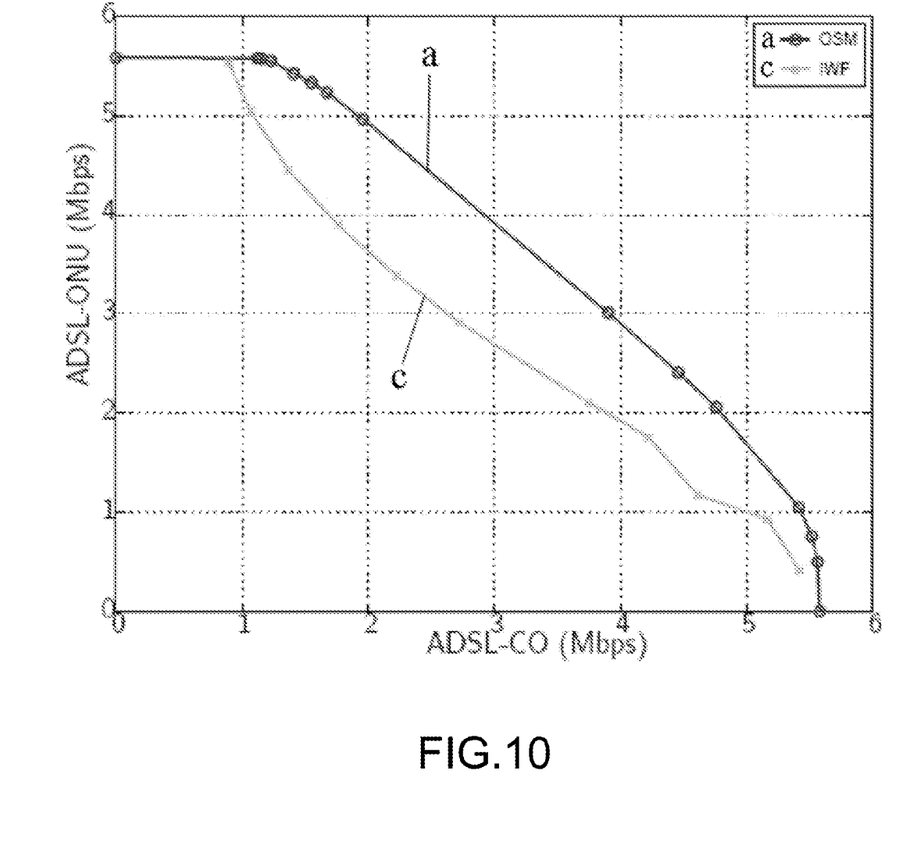
FIG. 10 illustrates a chart of comparison between the OSM and IWF in a severe crosstalk scenario as illustrated in FIG. 9.

FIG. 10 illustrates a comparison between the OSM and IWF in a severe crosstalk scenario.

When the crosstalk is not that severe, the result of the second type of algorithm (or the distributed method) is substantially close to that of the first type of algorithm (or the center controller method). However, when the crosstalk is severe, the second type of algorithm may obtain a far poorer result than from the first type of algorithm. In the case of a poor scenario as illustrated in FIG. 10, the IWF algorithm of the second type of algorithm has a far poorer performance than the OSM algorithm of the first type of algorithm.

Therefore, it is desirable to make improvement to the IWF method so that IWF may approximate the OSM performance while still remain its simple complexity, thereby achieving ideal autonomous spectrum management.

SUMMARY

A method and apparatus for spectrum management in an xDSL system are provided according to various embodiments of the present invention, in order to solve the unbalance between the performance and the complexity in the prior arts.

A method for spectrum management in xDSL system includes:

determining a transmit power spectrum density (PSD) mask according to a crosstalk status of a line;

performing an iterative water filling operation using the transmit PSD mask; and managing line spectrum dynamically according to the result of the iterative water filling operation.

An apparatus for spectrum management in xDSL system includes:

a transmit PSD mask determination module, configured to determine a transmit PSD mask according to a crosstalk status of a line;

an iterative water filling operation module, configured to perform iterative water filling operation using the transmit PSD mask; and dynamic spectrum management module, configured to dynamically manage line spectrum according to the result of the iterative water filling operation.

An xDSL system includes a DSLAM and further includes the above mentioned apparatus for spectrum management. The system dynamically manages the line spectrum of the DSLAM using the apparatus for spectrum management.

A DSLAM includes the above mentioned apparatus for spectrum management and dynamically manages the line spectrum with the apparatus for spectrum management.

According to the foregoing technical solutions, the embodiments of the present invention embrace the below technical effects.

An autonomous method and apparatus for dynamic power spectrum management provided according to embodiments of the present invention may allow the DSLAM to approximate OSM performance in a severe crosstalk scenario without a center controller and with a rather simple algorithm. Moreover, the embodiments of the present invention may help to simply the design of DSLAM optimization system and achieve a proper balance between the DSLAM performance and the complexity.

Other features and merits will be illustrated in the accompanying specification. Further, parts of these features and merits will become more readily appreciated by reference to specification or by reference to the following description of the embodiments. Purposes and other advantages of the present invention may be achieved and obtained with the structures specified by the specification, claims and accompanying drawings.

BRIEF DESCRIPTION OF THE DRAWINGS

The figures illustrated herein are intended to facilitate the understanding of the present invention, which constitute a part of the application. The illustrative embodiments and the description thereof are intended to interpret the present invention but not to limit the present invention.

DETAILED DESCRIPTION

Detailed description will be made below to various embodiments of the present invention in connection with the accompanying drawings.

An embodiment of the present invention provides a method for implementing IWF with a predetermined transmit PSD so as to enable the IWF performance to approximate OSM performance. As a result, a relatively optimal performance can be achieved without a center controller and with a relatively simple algorithm.

IWF is a greedy algorithm. It only takes into consideration the changes in transmit PSD $s_k^n$ in order to enable its own line rate to reach a predetermined target value $R^{target}$. It does not take into consideration the interference it exerted on the other lines, which may decrease the speed of the other lines. Its target function $J_k$ can be expressed as $J_k \cong b_k^n - \lambda_n s_k^n$. FIG. 8 illustrates an implementation of IWF, where $s_k^n$ denotes the transmit power of subscriber line n on tune k. $P_n$ denotes a transmit power constraint on subscriber line n; $b_k^n$ denotes the achievable number of bits loaded on subscriber line n on tone k. $R^{target}$ denotes a target line rate.

As can be seen from FIG. 8, if there are N users in total, then N users may accomplish the innermost loop function as shown in FIG. 8 with a certain sequence. Theoretically, it can be ensured that N users may be in turns and finally reaches a balance. The balance point is a local optimal solution for IWF. It has a much higher transfer rate than the modem which does not carry out IWF operation.

The main purpose of the inner loop in FIG. 8 is to figure out the power to be transmitted by a corresponding transmitter and the corresponding transferable number of bits when the target function $J_k$ is at its maximum. Meanwhile, in the inner loop, $s_k^n$ should be defined within $0 \leq s_k^n \leq smask_k^n$, where $smask_k^n$ denotes a PSD mask of user n on tune k. In normal cases, the PSD mask should be defined by a corresponding standard. For instance, the PSD mask specified in the ADSL standard includes Limit PSD MASK, MIB PSD MASK and Transmit PSD MASK, etc.

Figure 11:
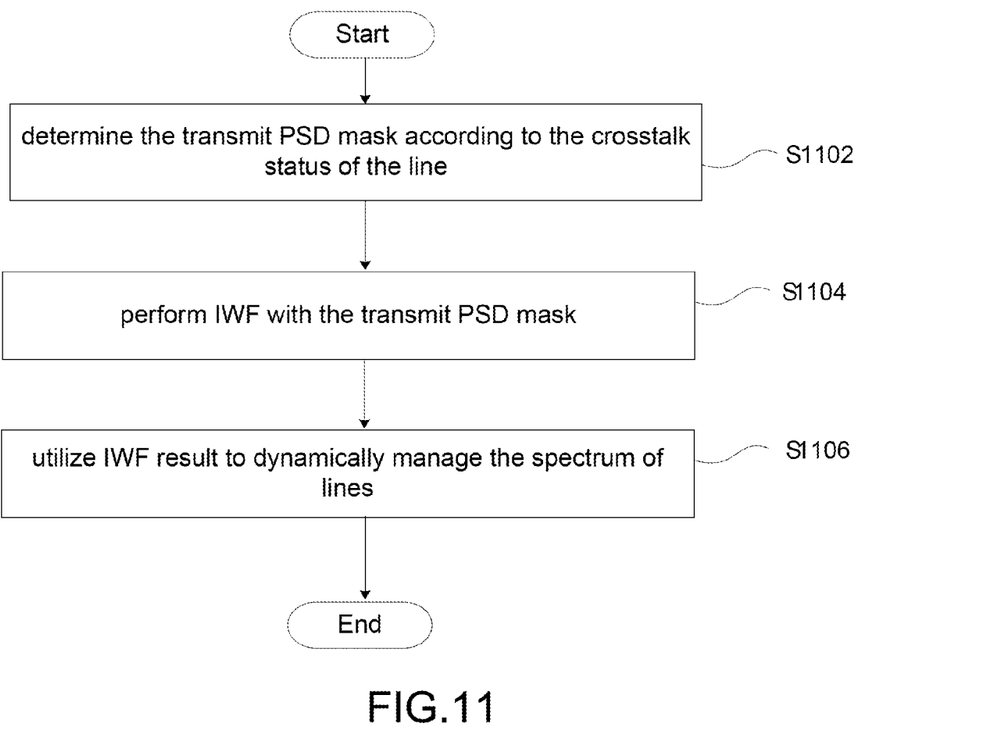
FIG. 11 is a flowchart of a spectrum management method according to one embodiment of the present invention.

FIG. 11 is a flowchart of a spectrum management method according to one embodiment of the present invention;

Step S1102: The transmit PSD mask is determined according to the crosstalk status of the line.

Step S1104: IWF is performed by using the transmit PSD mask.

Step S1106: IWF result is used to dynamically manage the spectrum of lines.

Optionally, step S1102 includes the following steps. Step a1; A crosstalk status is obtained according to the wiring scenario and empirical formula of xDSL system. Step a2: The transmit PSD mask of a transmitter is determined according to the crosstalk status.

Optionally, the wiring scenario includes at least one of the followings: line specification, crosstalk coupling length, standard mask in use.

Optionally, step a2 includes the following steps: setting interference management threshold m and determining a frequency band f1~f2 above m according to the crosstalk status; and calculating a new transmit PSD mask according to the empirical formula. Optionally, the empirical formula can be expressed as $$smask(f1\sim f2)=smask(f1\sim f2)+(|H_{FEXT}(f1\sim f2)|+m+b)$$

where b is a dB value of the reduced transmit PSD mask, and b is negative. The smask(f1~f2) on the left of the equation is the new transmit PSD mask on band f1~f2 to be solved. The smask(f1~f2) on the right of the equation is the original PSD mask on band f1~f2. ($|H_{FEXT}(f1\sim f2)|$) is a crosstalk function on band f1~f2. ($|H_{FEXT}(f1\sim f2)|$)+m+b is a value for updating. If it is determined according to the crosstalk status that the PSD mask has not been changed or has not been updated, this updating term is zero.

Figure 12:
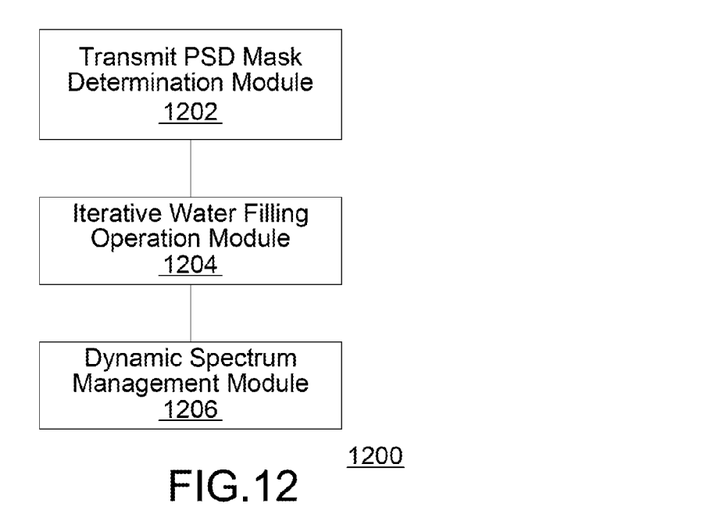
FIG. 12 is a diagram of a spectrum management apparatus according to one embodiment of the present invention.

FIG. 12 is a diagram of a spectrum management apparatus 1200 according to one embodiment of the present invention. The apparatus includes:

a transmit PSD mask determination module 1202, configured to determine transmit PSD mask according to the crosstalk status of the line.

an iterative water filling operation module 1204, configured to perform IWF operation using the transmit PSD mask; and a dynamic spectrum management module 1206, configured to dynamically manage the line spectrum according to the result of IWF operation.

Optionally, the transmit PSD mask determination module 1202 includes a crosstalk calculation module (not shown) configured to obtain crosstalk status according to the wiring scenario and empirical formula of the xDSL system; and a determination module (not shown) configured to determine the transmit PSD mask of a transmitter according to the crosstalk status.

Optionally, the wiring scenario includes at least one of a line specification, a crosstalk coupling length, a standard mask in use.

Optionally, the determination module is used to set an interference management threshold m and determine a frequency band f1~f2 higher than m according to the crosstalk status; and calculate a new transmit PSD mask according to the empirical formula.

Optionally, the empirical formula can be expressed as $$smask(f1\sim f2)=smask(f1\sim f2)+(|H_{FEXT}(f1\sim f2)|+m+b)$$

where b is a dB value of the reduced transmit PSD mask, and b is negative. The smask(f1~f2) on the left of the equation is the new transmit PSD mask on band f1~f2 to be solved. The smask(f1~f2) on the right of the equation is the original PSD mask on band f1~f2. ($|H_{FEXT}(f1\sim f2)|$) is a crosstalk function on band f1~f2. ($|H_{FEXT}(f1\sim f2)|$)+m+b is a value for updating. If it is determined according to the crosstalk status that the PSD mask has not been changed or has not been updated, this updating term is zero.

The specific scheme according to the embodiments of the present invention is described below when taking the wiring scenario in FIG. 9 and ADSL implementation as an example.

Figure 13:
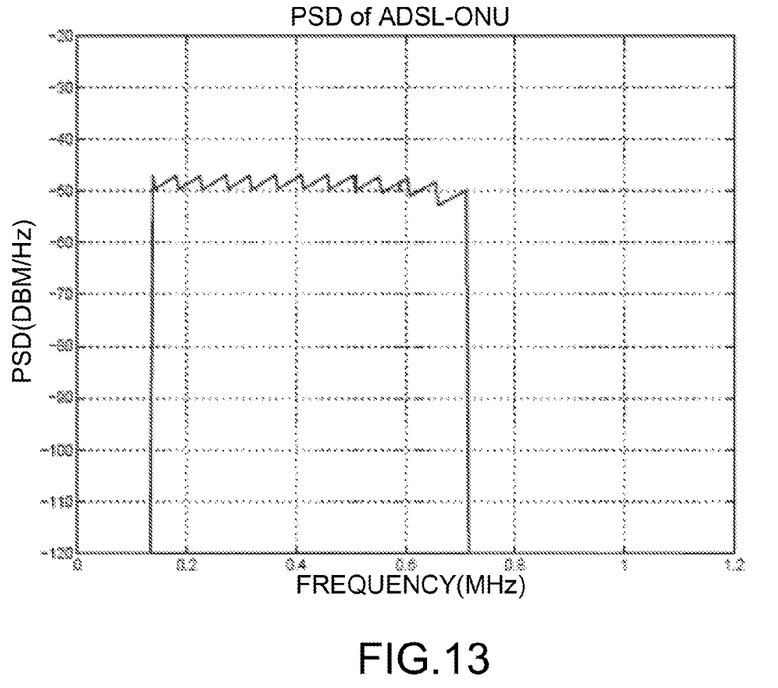
FIG. 13 is a transmit PSD of ONU terminal using the IWF method according to the wiring scenario as illustrated in FIG. 9 according to one embodiment of the present invention.
Figure 14:
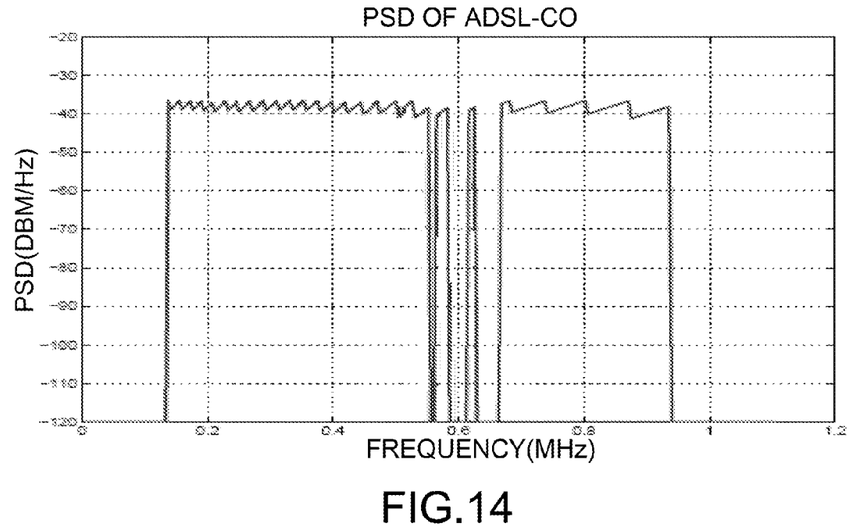
FIG. 14 is a transmit PSD of CO terminal using the IWF method according to the wiring scenario as illustrated in FIG. 9 according to one embodiment of the present invention.

FIG. 13 and FIG. 14 are transmit power spectrums obtained using IWF method according to the wiring scenario as illustrated in FIG. 9. FIG. 13 is a transmit power spectrum of Optical Networking Unit (ONU) end. FIG. 14 is a transmit power spectrum of Center Office (CO) end.

Figure 15:
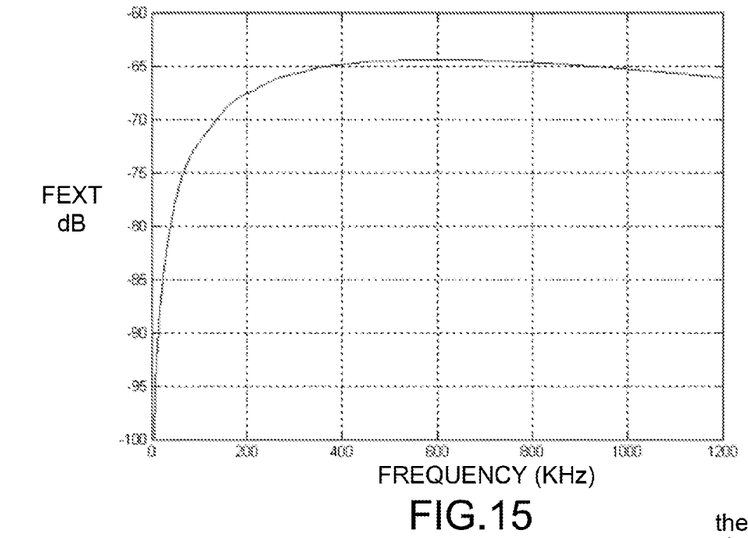
FIG. 15 illustrates a FEXT function between ONU and user 1 according to FIG. 9 according to one embodiment of the present invention.

The distance from ONU to user 1 is 3 kft. The FEXT function between them is illustrated in FIG. 15. The FEXT values on 0.4~1 MHz are all above −65 dB. As can be seen from calculation, the signal transmitted by the ONU within this band may produce a significant crosstalk on user 1. The downstream line of user 1 is at a very low rate. As can be seen from FIG. 6, the transmit PSD of ONU with IWF method has not been adjusted on frequency band 0.4-0.7 MHz. The transmit PSD of ONU on this frequency band is still the same as the transmit PSD on other band. This is because the IWF algorithm is a greedy algorithm. As long as it can increase its own rate a little bit, it may increase its transmit power without any consideration of causing a decrease of line rate to the other lines. Therefore, global optimal result may not be achieved. From global perspective, appropriate restriction should be made to the downstream of ONU so as to obtain a more optimal result.

The method according to embodiments of the present invention is detailed below.

Step 1: A transmit PSD mask is determined.

1) calculating an overall crosstalk status according to wiring scenario and empirical formula.

The wiring scenario includes line specification (medium, line diameter), line coupling length (l), standard mask in use, etc.

The empirical formula for calculating crosstalk can be expressed as $$|H_{FEXT}(f)| = \sqrt{|H_{channel}(f)|^2 \times k \times l \times f^2},$$

where a coupling constant k=3.083×10⁻²⁰ and $|H_{channel}(f)|$ is the attenuation on the line corresponding to the crosstalk coupling length. $|H_{channel}(f)|$ can be obtained by empirical formula according to the parameters determined according to the wiring scenario. f may be obtained by the standard mask in use. If the standard mask in use is ADSL, the range of f for downstream channel is on the order of 0.25-1.2 MHz.

2) determining the transmit PSD mask of each transmitter according to the overall crosstalk status.

A. set a threshold m, for instance, −65 dB in one embodiment of the present invention; and determine a frequency band above this threshold according to the crosstalk status, e.g., f1~f2, f3~f4, etc.

B. restrict the transmit PSD mask of the interferer on the above bands. Finally, the transmit PSD mask on these bands is $$smask(f1\sim f2)=smask(f1\sim f2)+(|H_{FEXT}(f1\sim f2)|+m+b),$$

where b is the dB value of the decreased portion of PDS, and b is negative. For instance, b may be −20 dBm/Hz.

Step 2: Power is transmitted by using IWF method on the premise of the determined transmit PSD mask.

It is appreciated by those skilled in the art that IWF method in the embodiment may be any known IFW method in the prior art. Since it has been described above, the description of this method is omitted.

Figure 16:
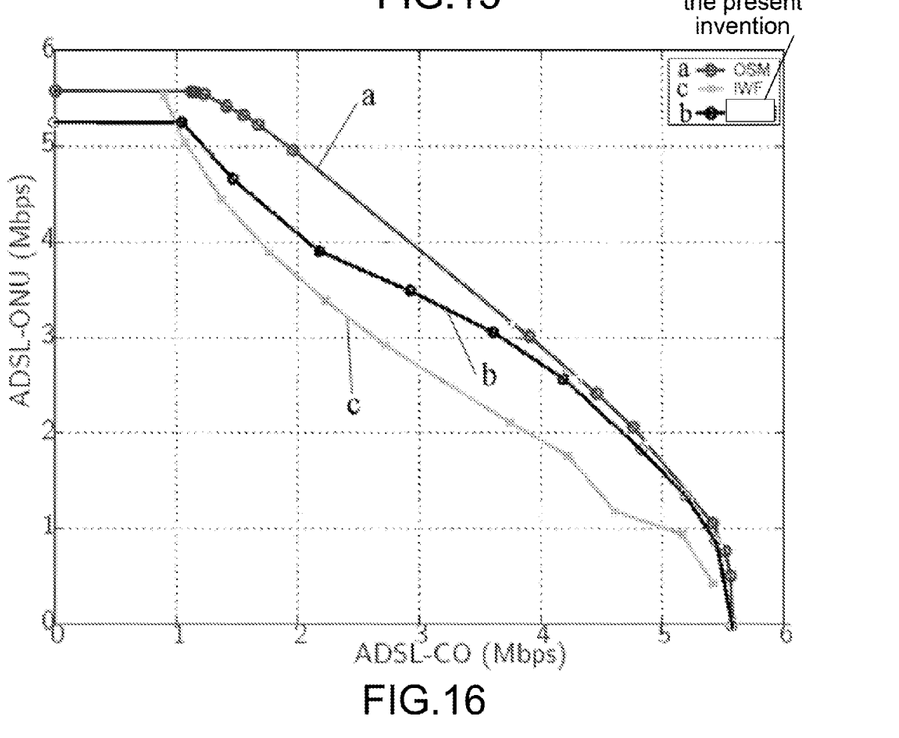
FIG. 16 illustrates the result of IWF using the PSD constraints according to the scenario illustrated in FIG. 9 according to one embodiment of the present invention.

As stated above, the embodiment performs optimization with the spectrum management method according to the embodiments of the present invention. Initially, the embodiment sets a limitation to the transmit PSD of ONU and reduces the PSD mask of ONU by 20 dBm/Hz on the frequency band of 0.4-0.8 MHz according to the crosstalk function in FIG. 15. Then, IWF is performed on the basis of the restricted PSD mask. The result is shown in the intermediate plot among three plots in FIG. 16. The performance substantially approximates the results of OSM, except that the transmit PSD of the ONU terminal is restricted so that it may not reach the rate as high as it originally does.

In normal cases, the PSD mask should be defined by a corresponding standard. For instant, the PSD mask specified in the ADSL standard includes Limit PSD mask, MIB PSD mask and Transmit PSD mask, etc. However, in the embodiment of the present invention, the overall crosstalk status is calculated according to wiring scenario and empirical formula. Then, the PSD mask of each transmitter is determined according to the overall crosstalk status.

As can be seen from the above description, the embodiment of the present invention embraces the following technical effects.

Methods and apparatuses of autonomous dynamic power spectrum management are provided according to embodiments of the present invention. The method and apparatus may allow the DSLAM to approximate OSM performance in a severe crosstalk scenario without a center controller and with a rather simple algorithm. Moreover, embodiments of the present invention simplify the design of DSLAM optimization system. As such, the embodiments of the present invention may achieve a proper balance between the DSLAM performance and the complexity.

Apparently, it is understood by those skilled in the art that each module or step in the embodiments of the present invention may be implemented with general computing device(s). These modules or steps may be integrated in a single computing device or distributed in a network connected by a plurality of computing devices. Optionally, they may be implemented by program codes executable with the computing device. However, they may also be stored in a storage device for execution by the computing device. Alternatively, they may be manufactured as integrated circuit modules respectively. Or, a plurality of modules or steps among them may be in the form of a single integrated circuit module. Accordingly, the present invention is not limited to any combination of specific hardware and software. It should be understood that the modifications made to the specific embodiment is apparent to those skilled in the art without departing from the spirit of the scope of the present invention.

The foregoing are merely various embodiments of the present invention, which are not intended to limit the present invention. Any modifications and variations can be made to the present invention by those skilled in the art. Any modifications, equivalents, improvements made within the spirit and principle of the present invention shall be construed as fall within the scope of the present invention.

What is claimed is:

1. A method for spectrum management in an xDSL system, comprising:
   determining a line attenuation corresponding to a crosstalk coupling length according to a wiring scenario of the xDSL system and obtaining a crosstalk status according to the line attenuation;
   setting an interference management threshold m, and determining a frequency band f1~f2 higher than m according to the crosstalk status;
   calculating a transmit power spectrum density (PSD) mask according to an original PSD mask and a crosstalk function on frequency band f1~f2;
   performing an iterative water filling operation using the transmit PSD mask; and
   managing line spectrum dynamically according to the result of the iterative water filling operation.

2. The method of claim 1, wherein the wiring scenario comprises at least one of a line specification, a crosstalk coupling length, a standard MASK.

3. The method of claim 1, wherein the calculating a transmit power PSD is implemented by an empirical formula:

$$smask(f1\sim f2)=smask(f1\sim f2)+(|H_{FEXT}(f1\sim f2)|+m+b),$$

wherein b is a dB value of a decreased portion of the transmit PSD mask and is negative;
   smask f1~f2) on the left of the equation is the PSD mask calculated on frequency band f1~f2;
   smask f1~f2) on the right of the equation is the original PSD mask on frequency band f1~f2;
   (|H$_{FEXT}$(f1~f2)|) is a crosstalk function on frequency band f1~f2;
   (|H$_{FEXT}$(f1~f2|)+m+b is a value used for updating, wherein if it is determined according to the crosstalk status that the PSD mask has not been changed or updated, this term is zero.

4. An apparatus for spectrum management in an xDSL system, comprising:
   a transmit power spectrum density (PSD) mask determination module, configured to determine a transmit PSD mask according to a crosstalk status of a line;
   an iterative water filling operation module, configured to perform iterative water filling operation using the transmit PSD mask; and
   a dynamic spectrum management module, configured to dynamically manage line spectrum according to the result of the iterative water filling operation,
   wherein the transmit PSD mask determination module comprises:
   a crosstalk calculation module, configured to determine a line attenuation corresponding to a crosstalk coupling length according to a wiring scenario of the xDSL system and obtaining the crosstalk status according to the line attenuation;
   a determination module, configured to set an interference management threshold m and determine a frequency band f1~f2 higher than m according to the crosstalk status, and calculate the transmit PSD mask according to an original PSD mask and a crosstalk function on frequency band f1~f2.

5. The apparatus of claim 4, wherein the wiring scenario includes at least one of a line specification, a crosstalk coupling length, a standard MASK in use.

6. The apparatus of claim 4, wherein the determination module comprises a module for calculating the new transmit PSD mask, wherein the module for calculating the transmit PSD mask calculates the transmit PSD mask with an empirical formula, wherein the empirical formula is expressed as $$\text{smask}(f1\sim f2)=\text{smask}(f1\sim f2)+(|H_{FEXT}(f1\sim f2)|+m+b),$$

where b is a dB value of a decreased portion of the transmit PSD mask and is negative;

smask (f1~f2) on the left of the equation is the PSD mask calculated on frequency band f1~f2;

smask (f1~f2) on the right of the equation is the original PSD mask on frequency band f1~f2;

($|H_{FEXT}(f1\sim f2)|$) is a crosstalk function on frequency band f1~f2;

($|H_{FEXT}(f1\sim f2|)+m+b$ is a value used for updating, wherein if it is determined according to the crosstalk status that the PSD mask has not been changed or updated, this term is zero.

7. An xDSL system, comprising:

a Digital Subscriber Line Access Multiplexer (DSLAM);

an apparatus for spectrum management configured to dynamically manage a line spectrum of the DSLAM, wherein the apparatus for spectrum management includes:

a transmit power spectrum density PSD mask determination module, configured to determine a transmit PSD mask according to a crosstalk status of a line;

an iterative water filling operation module, configured to perform iterative water filling operation using the transmit PSD mask; and a dynamic spectrum management module, configured to dynamically manage line spectrum according to the result of the iterative water filling operation;

wherein the transmit PSD mask determination module comprises:

a crosstalk calculation module, configured to determine a line attenuation corresponding to a crosstalk coupling length according to a wiring scenario of the xDSL system and obtaining the crosstalk status according to the line attenuation;

a determination module, configured to set an interference management threshold m and determine a frequency band f1~f2 higher than m according to the crosstalk status, and calculate the transmit PSD mask according to an original PSD mask and a crosstalk function on frequency band f1~f2.

* * * * *

UNITED STATES PATENT AND TRADEMARK OFFICE
CERTIFICATE OF CORRECTION

PATENT NO. : 8,000,219 B2
APPLICATION NO. : 12/433287
DATED : August 16, 2011
INVENTOR(S) : Fang et al.

Page 1 of 1

It is certified that error appears in the above-identified patent and that said Letters Patent is hereby corrected as shown below:

Column 12, line 31, "smask f1 ~ f2)" should read -- smask (f1~f2) --.

Column 12, line 33, "smask f1 ~ f2)" should read -- smask (f1~f2) --.

Signed and Sealed this
Fourth Day of October, 2011

David J. Kappos
*Director of the United States Patent and Trademark Office*